(12) United States Patent
Guiton

(10) Patent No.: US 10,166,713 B2
(45) Date of Patent: Jan. 1, 2019

(54) MOULD WITH A MOVABLE BOTTOM AND HORIZONTAL JOINT PLANE

(71) Applicant: SIDEL PARTICIPATIONS, Octeville sur Mer (FR)

(72) Inventor: Camille Guiton, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 562 days.

(21) Appl. No.: 14/777,923

(22) PCT Filed: Apr. 8, 2014

(86) PCT No.: PCT/FR2014/050833
§ 371 (c)(1),
(2) Date: Sep. 17, 2015

(87) PCT Pub. No.: WO2014/170577
PCT Pub. Date: Oct. 23, 2014

(65) Prior Publication Data
US 2016/0279856 A1  Sep. 29, 2016

(30) Foreign Application Priority Data

Apr. 15, 2013 (FR) .................................... 13 53406

(51) Int. Cl.
*B29C 49/12* (2006.01)
*B29C 49/48* (2006.01)
(Continued)

(52) U.S. Cl.
CPC .............. *B29C 49/48* (2013.01); *B29C 49/12* (2013.01); *B29C 2049/4892* (2013.01); *B29K 2667/003* (2013.01); *B29L 2031/712* (2013.01)

(58) Field of Classification Search
CPC .... B29C 2049/4892; B29C 2049/4871; B29C 2049/4807; B29C 49/30
See application file for complete search history.

(56) References Cited

U.S. PATENT DOCUMENTS 5,122,327 A   6/1992  Spina et al.
5,454,707 A  10/1995  Mitchell et al.
(Continued)

FOREIGN PATENT DOCUMENTS

FR    2 938 464 A1   5/2010
JP    S59 73925 A    4/1984
(Continued)

OTHER PUBLICATIONS

International Search Report, dated Jun. 17, 2014, from corresponding PCT application.

*Primary Examiner* — Stella K Yi
(74) *Attorney, Agent, or Firm* — Young & Thompson

(57) ABSTRACT

A mould (12) for producing, from a blank (3), a container (2) having a bottom (6) provided with a seat (8), the mould (12) including: —a wall (14) delimiting a cavity (17) and, beyond the cavity (17), a hollow recess (21) opening into the cavity (17) via an opening (20); —a mould bottom (16) that is movable relative to the wall (14), the bottom having an upper surface (27) defining a seat surface (28) having the footprint of the seat (8) of the container (2). In this mould: —the wall (14) has a counterbore (24) that defines, at the top, the hollow recess (21) and that extends perpendicular to and around the opening (20), substantially parallel to the central axis (X); —the upper surface (27) defines a peripheral face (30) that extends flush with the counterbore (24).

17 Claims, 3 Drawing Sheets

(51) Int. Cl.
*B29L 31/00* (2006.01)
*B29K 667/00* (2006.01)

(56) References Cited

U.S. PATENT DOCUMENTS

2012/0031916 A1\* 2/2012 Derrien .................. B29C 49/48
 220/675
2013/0031916 A1 2/2013 Matsubara

FOREIGN PATENT DOCUMENTS

JP 2001 088202 A 4/2001
WO 99/52701 A1 10/1999

\* cited by examiner

MOULD WITH A MOVABLE BOTTOM AND HORIZONTAL JOINT PLANE

The invention relates to the manufacturing of containers, such as bottles or jars, obtained by forming, and more specifically by blow molding or stretch-blow molding, from parisons of thermoplastic material.

BACKGROUND OF THE INVENTION

Field of the Invention

To manufacture a container according to the blow-molding technique, the first step is to heat a parison (whether it is a preform or an intermediate container that has undergone a first blow-molding operation starting from a preform) to a temperature that is higher than the glass transition temperature of the constituent material of the parison. Next, the parison is inserted into a mold, and then the blow molding of the parison is carried out by injecting therein a gas (such as air) under high pressure (in general greater than 25 bar).

The stretch-blow-molding technique consists, in addition to the blow molding, in stretching the parison by means of a sliding rod, so as to minimize the offsetting of the container and to make the distribution of the material as uniform as possible.

A container comprises a lateral wall (also referred to as a body), a neck that extends from an upper end of the body, and a bottom that extends from a lower end of the body, opposite the neck. The bottom of the container defines a base, in general at the junction with the body, and by which the container can rest on a flat surface (such as a table).

The mold comprises a wall that defines a cavity that is designed to impart its shape to the body of the container. This cavity is closed, at a lower end, by a mold bottom designed to impart its shape to the bottom of the container.

One of the main objects targeted today by the manufacturers is the reduction in the amount of material used, which is reflected by a reduction in the weight of the containers, regardless of the use of the latter (still liquids, carbonated liquids, liquids introduced hot into the containers). In return for this lightening of the containers, an attempt is made to increase their rigidity by means of artifacts linked either to the method of manufacturing or to the design, because the structural rigidity associated with just the bi-orientation (axial and radial molecular orientation in relation to the longitudinal central axis of the container) appears inadequate.

It even happens that certain specifications (in particular for hot filling applications or HR—heat resistant) prescribe the reduction in weight and the increase in the structural rigidity of the container at the same time, which increases the design difficulties of the latter. In the HR applications, the structural rigidity of the container can be increased thermally by means of a heat-setting (in English, heat set) of the material, consisting in keeping the container in contact with the heated wall of the mold, which increases the crystallinity rate of the material.

Concerning more particularly the bottom of the container, its structural rigidity can also be increased (or controlled) mechanically by means of a local overstretching of the material, by means of a mold provided with a stationary wall with the impression of the body of the container, and a mold bottom with the impression of the bottom of the container, with this mold bottom being mounted to move in relation to the wall. The container is first blow-molded beyond its final shape, in a bottom position of the mold bottom, and then the mold bottom is moved toward a top position corresponding to the final shape of the container.

Description of the Related Art

This technique, referred to as "boxing," illustrated in the French patent application FR 2 938 464 (SIDEL) or its U.S. equivalent US 2012/031916, makes it possible to improve the mechanical strength of the bottom of the container, in particular in the area of the base.

In such a mold, a gap is provided between the mold bottom, mounted on a guide jack, and the wall, to maintain between these two parts operational play that has two purposes: on the one hand, to make possible the movement without wedging of the mold bottom in relation to the wall; on the other hand, to form a decompression air-hole making it possible to evacuate the air that is trapped between the mold and the container during blow molding.

This technique is satisfactory but can be improved upon.

Actually, the operational play between the mold and the mold bottom cannot be less than the guiding precision of the jack, which is on the order of several tenths of millimeters for travel on the order of 20 to 30 mm.

In other words, this operational play is of the same order of magnitude as the thickness of the material of the final container. The material consequently has a tendency, during blow molding, of flowing into the gap when the mold bottom is in the bottom position. The thus pinched material forms, when the mold bottom is moved toward its top position, a thin bead of material that remains on the final container. This bead, forming a projection on the base of the container, is detrimental to the stability of the latter.

A first solution can consist in trimming the container, by cutting or by abrasion. This solution is not realistic on the industrial scale, however, taking into account production rates (several tens of thousands of containers per hour and per blow-molding machine).

A second solution can consist in adding to the jack a precision guiding device (for example with balls), in such a way as to reduce the operational play between the mold bottom and the wall of the mold. This solution, however, runs up against practical difficulties, because the space requirement of the guiding device would make it necessary to modify the structure of the depth of the mold, whereas in the space is counted all around the latter, taking into account in particular the presence of ducts and connections that are necessary for the circulation of temperature-regulating fluids (heating and/or cooling) in the wall of the mold.

A third solution can consist in anticipating the command for raising the mold bottom, so that the material does not have time to slip back between the wall of the mold and the mold bottom. Under these conditions, however, the material that is intended for the bottom of the container is insufficiently stretched, and the base proves to be poorly formed, which reduces the advantage of the boxing.

In addition, the reduction in the operational play between the mold bottom and the wall of the mold is likely to impede the evacuation of the air that is present in the mold, with a risk of malformation of the container (with an equivalent cycle time) or with an increase in the cycle time (with an equivalent quality of the container).

BRIEF SUMMARY OF THE INVENTION

One objective of the invention is to propose a technique for manufacturing containers, applicable to all types of containers, having a correctly formed base and exhibiting both good rigidity and good stability.

For this purpose, in the first place, a mold is proposed for the manufacturing, starting from a parison, of a container having a body and a bottom provided with a peripheral base that extends essentially perpendicular to the body from a lower end of the latter, this mold comprising:

a wall having an inner surface that determines the impression of the body of the container and that delimits a cavity, with this inner surface ending, at a lower end, in an opening, the wall defining, beyond the cavity, a recessed reserve emptying into the cavity via the opening;

a mold bottom that can move in relation to the wall between an extended position, in which the mold bottom is separated from the opening, and a retracted position, in which the mold bottom is fitted into the reserve, with the bottom having an upper surface that defines a base surface determining the impression of the base of the container and that extends perpendicular to the opening.

In this mold:

the wall has a counterbore that delimits the recessed reserve on the top and that extends on a level with and around the opening, essentially perpendicular to the central axis;

the upper surface of the mold bottom defines a peripheral face that extends in the lengthening of the base surface around the latter, perpendicular to the counterbore.

Such a configuration of the mold makes it possible to produce a parting line that is essentially horizontal between the wall of the mold and the mold bottom. The container that is blow-molded in such a mold has no axial projection over its base, promoting its stability.

Various additional characteristics can be provided, by themselves or in combination:

the wall of the mold has a peripheral lip that projects on the inside and has an edge that defines the opening;

the lip forms, in cross-section, an acute angle in the area of the edge;

the reserve is delimited laterally by a bore that extends axially in the lengthening of the counterbore;

a gap remains between the counterbore and the peripheral face in the retracted position of the mold bottom;

the reserve has a bore that extends axially in the lengthening of the counterbore, and the mold bottom is provided with a skirt that extends axially from the side opposite to the upper surface, with this skirt being housed in the bore in the retracted position of the mold bottom;

operational play is provided between the skirt and the bore.

In the second place, a method for manufacturing a container from a parison is proposed, in which this method comprises operations that consist in:

inserting the parison into a mold as presented above, with the mold bottom being in an extended position, forming the container by injecting a pressurized fluid into the parison, during the forming, moving the mold bottom toward its retracted position.

BRIEF DESCRIPTION OF THE DRAWINGS

Other objects and advantages of the invention will come to light in the description provided below with reference to the accompanying drawings in which.

DETAILED DESCRIPTION OF THE PREFERRED EMBODIMENTS

Figure 1:
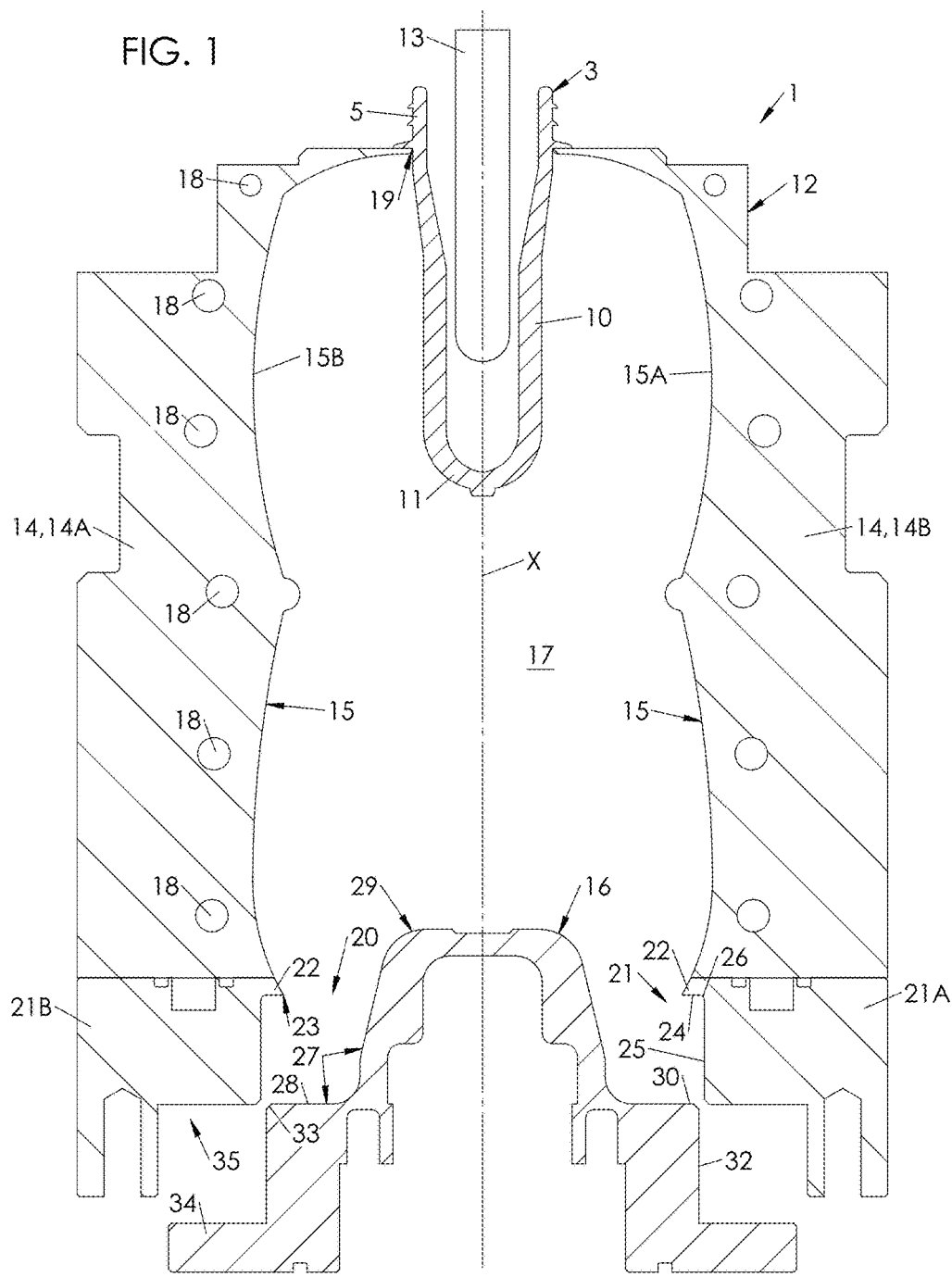
FIG. 1 is a cross-section of a forming unit that comprises a mold equipped with a wall and a movable mold bottom, shown in a bottom position corresponding to the beginning of a forming cycle.

A unit 1 for forming a container 2 by stretch-blow molding starting from a parison 3—in this case, a preform—of plastic material (such as PET) is partially shown in the figures.

The container 2 that is to be formed has a body 4 that extends along a main axis X, a neck 5 that lengthens the body 4 at an upper end of the latter, and a bottom 6 that closes the body 4 at a lower end 7 of the latter, opposite to the neck 5. The bottom 6 of the container has a peripheral base 8 that defines a standing plane that is essentially perpendicular to the axis X of the container 2 and by which the container 2 is designed to rest on a flat surface such as a table. The bottom 6 has a central arch 9 that lengthens the base 8 toward the axis X of the container 2 and projects toward the inside of the latter.

Figure 2:
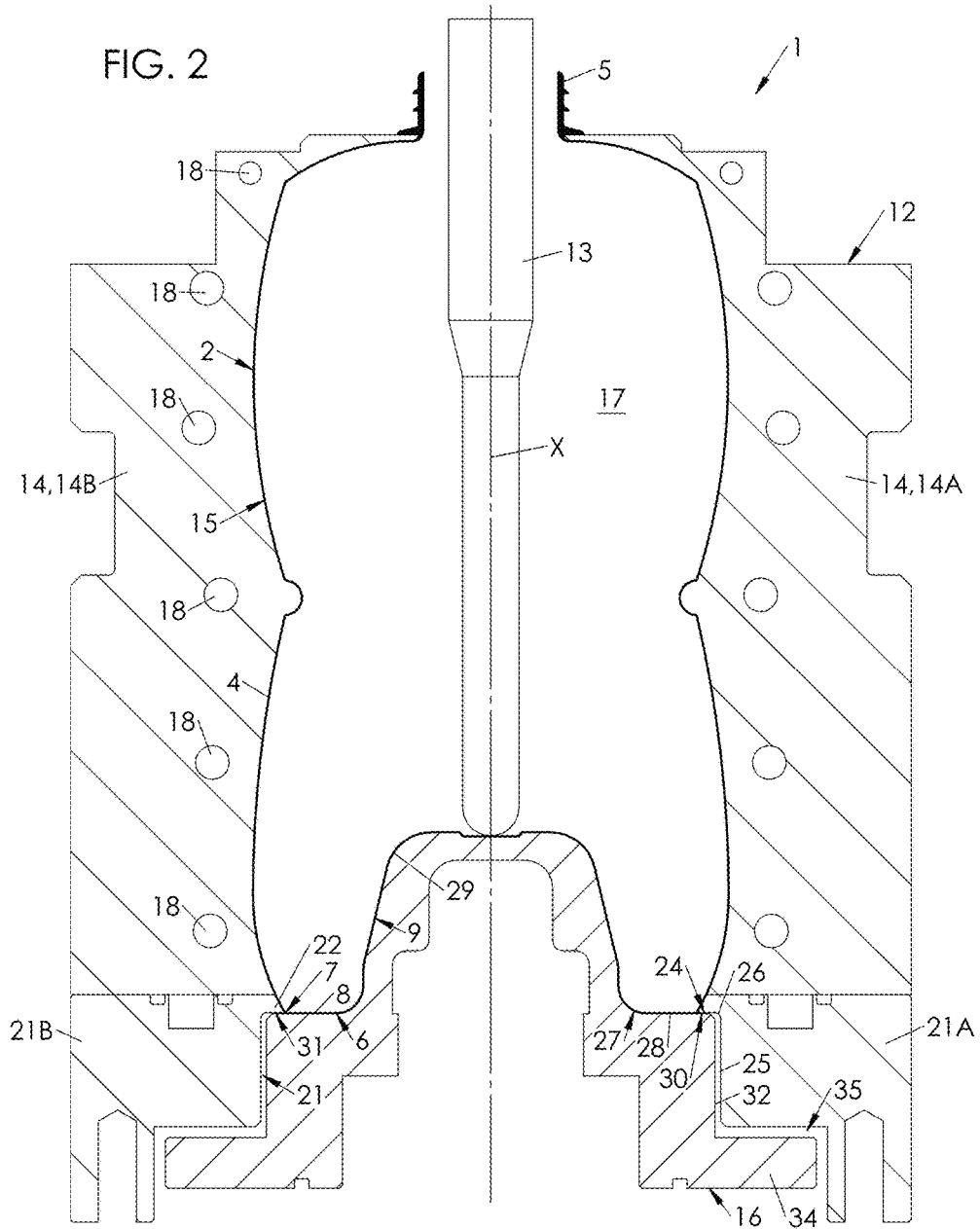
FIG. 2 is a view similar to FIG. 1, in which the forming unit is shown with the mold bottom in the top position, at the end of the forming cycle.

As shown in FIG. 2, the body 4 of the container 2 is curved at its lower end 7, in the vicinity of its junction with the bottom 6. This shape is, however, illustrative, and the body 4 could be straight at its lower end 7.

Each preform 3 comprises an essentially cylindrical barrel 10, designed to form the body 4 of the container 2, a neck 5 that remains unchanged on the container 2, as well as a hemispherical dome 11 that closes the barrel 10 opposite to the neck 5 and is designed to form the bottom 6 of the container 2.

The forming unit 1 comprises a mold 12, a stretching rod 13, as well as blow-molding means (not shown) that include in particular a nozzle, pressurized gas sources, and solenoid valves that, in a standard manner, are, for example, assembled in a block that tops the nozzle.

The mold 12 is, for example, of the portfolio type and comprises two half-molds articulated around a hinge, with these two half-molds being opened to make possible, at the beginning of the forming cycle, the insertion of a preheated preform 3, and, at the end of the cycle, the evacuation of the formed container 2.

As the figures show, the mold 12 comprises a lateral wall 14, preferably consisting of, according to a known principle, two half-molds 14A, 14B, which can be drawn together or separated, each comprising a machined surface 15A, 15B. When the half-molds 14A, 14B are in contact with one another, these surfaces 15A, 15B jointly form an inner surface 15 that determines the impression of the body 4 of the container 2. The mold 12 also comprises a mold bottom 16 that determines the impression of the bottom 6 of the container 2. The inner surface 15 delimits a cavity 17 into which the preform 3 is inserted and in which the forming takes place. As shown in FIGS. 1 and 2, the wall 14, respectively each half-mold 14A, 14B, is traversed by channels 18 for the circulation of fluids that regulate the temperature (heating and/or cooling) of the wall 14.

The inner surface 15 extends around a central axis that is merged with the axis X of the container 2 that is to be formed. The inner surface 15 ends, at an upper end, in a hole 19 through which the barrel 10 of the preform 3 extends and, at an opposite lower end, in an opening 20.

Figure 3:
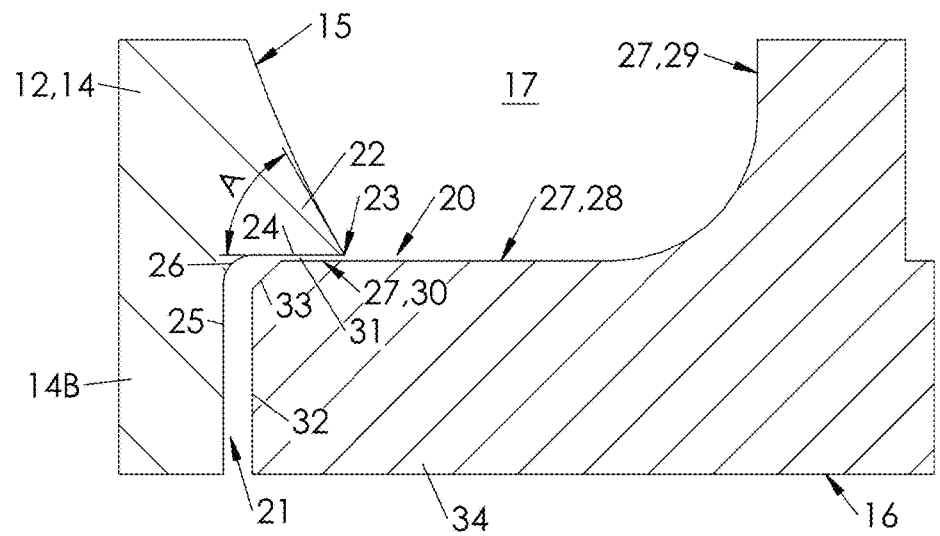
FIG. 3 is a detail view of the mold, showing the mold bottom in the top position, with the container being absent for the sake of clarity.
Figure 4:
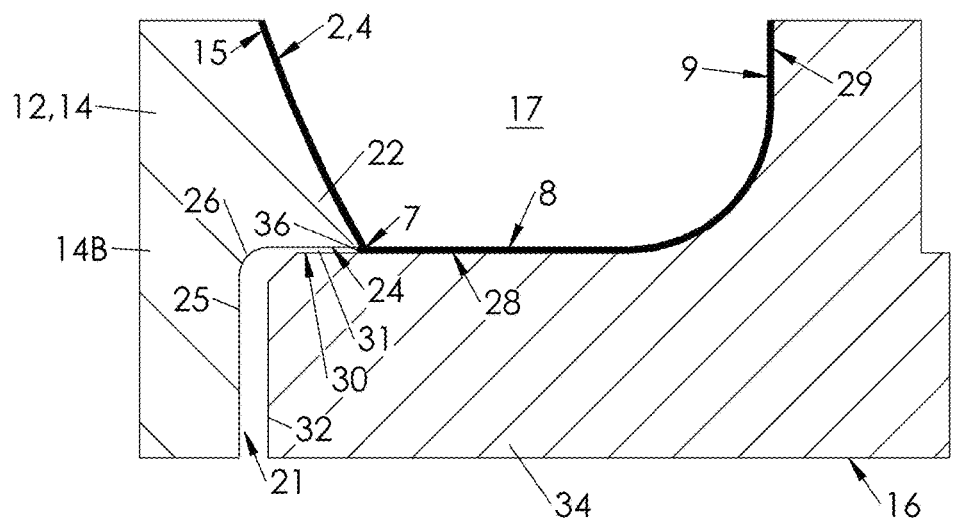
FIG. 4 is a view similar to FIG. 3, showing the mold bottom in the top position with the formed container.

The lateral wall 14 defines, beyond the cavity 17, a mating recessed reserve 21 of the mold bottom 16 in which the latter becomes fitted. According to the preferred embodiment, illustrated in the figures, the reserve 21 is at least partially formed using machining carried out in parts 21A, 21B that are respectively connected to each of the half-molds 14A, 14B. In one variant, the reserve 21 is produced by machining half-molds 14A, 14B, which then have a larger vertical extension, as FIGS. 3 and 4 show.

The reserve 21 empties into the cavity 17 by the opening 20. As shown in the figures, and more specifically in FIGS. 2 and 3, the wall 14 of the mold 12 has a peripheral lip 22 that projects on the inside and has an edge 23 that defines the opening 20 and corresponds, in the container 2, to the lower end 7 of the body 4. The lip 22 forms, in the cross-section, an acute angle A in the area of the edge 23, which reflects the curved nature of the body 4 of the container 2 in the vicinity of the bottom 6. The angle A is greater than or equal to 30°, and preferably greater than or equal to 60°. According to a preferred embodiment that is illustrated in the figures, the angle A is on the order of 65°.

As FIG. 1 shows, the reserve 21 is delimited on the top—i.e., from the side of the cavity 17—by a counterbore 24 formed by a peripheral transverse face rotated opposite the cavity 17. This counterbore 24 extends on a level with and around the opening 20, essentially in a horizontal plane (i.e., perpendicular to the axis X).

According to a particular embodiment illustrated in the figures, the reserve 21 has a bore 25 that extends axially in the lengthening of the counterbore 24. According to a particular embodiment illustrated in the figures, and more particularly visible in FIGS. 3 and 4, the mold 12 has a fillet 26 for connection to the junction between the counterbore 24 and the bore 25.

The mold bottom 16 is mounted to move axially relative to the wall 14 between an extended position, in which the mold bottom 16 is separated from the opening 20, and a retracted position, in which the mold bottom 16 is fitted into the reserve 21 by blocking the opening 20. The reason why the mold bottom 16 can move is to make it possible, during the forming, to overstretch the bottom 6 of the container 2, in the course of an operation called boxing during which the mold bottom 16, initially in the extended position, is moved toward its retracted position. For this purpose, the mold bottom 16 is, for example, mounted on a pneumatic or hydraulic jack (not shown).

In the configuration illustrated in the figures—provided by way of illustrative example—where the container 2 is oriented with the neck 5 on top, the extended position of the mold bottom 16 corresponds to a bottom position, and its retracted position corresponds to a top position.

The mold bottom 16 has an upper surface 27 that, in the top position of the mold bottom 16, closes the cavity 17 by blocking the opening, thus completing the impression against which is applied the material during the forming of the container 2.

In the first place, the upper surface 27 defines a base surface 28 with the impression of the base 8 of the container 2. The base surface 28 extends in a peripheral manner around the axis X and perpendicular to the latter (i.e., horizontally), perpendicular to the opening 20, inside the perimeter that is delimited by the latter.

In the second place, the upper surface 27 defines a piece 29 that is central with respect to the impression of the arch 9. This piece 29 projects axially from the base surface 28, on the inside of the latter. In the top position of the mold bottom 16, the piece 29 projects completely beyond the opening 20 toward the inside of the cavity 17.

In the third place, the upper surface 27 defines a peripheral face 30 that extends radially in the lengthening of the base surface 28, on the outside of the latter. The peripheral face 30 thus extends perpendicular to the counterbore 24, on the outside of the perimeter delimited by the opening 20. The peripheral face 30 is parallel to the counterbore 24 and extends horizontally, i.e., in a plane that is perpendicular to the central axis X.

The peripheral face 30 and the counterbore 24 jointly define, when the mold bottom 16 is in the top position (FIGS. 2 to 4), a peripheral parting line 31. Taking into account the orientation of the counterbore 24 and the peripheral face 30, the parting line 31 extends horizontally, essentially perpendicular to the axis X.

In the top position of the mold bottom 16, a contact is not necessary produced between the mold bottom 16 and the wall 14 of the mold 12, in the area of the parting line 31. According to a preferred embodiment, a gap in the area of the parting line 31 is still actually present at the top position of the mold bottom 16. This gap performs an air-hole function, whose purpose is to make possible the evacuation of the air trapped between the container 2 and the mold 12 at the end of the forming. This makes it possible to form the base 8 correctly, in particular at its junction with the lower end 7 of the body 4. Otherwise, an air bubble (or bubbles) could still be present at this junction, which would deform the base 8 and, at the very least, could reduce its width at the expense of the stability of the container 2.

The gap defined in the area of the parting line 31 in the top position of the mold bottom 16 is preferably on the order of one-tenth of a millimeter. This value is less than the thickness of the material of the container 2 at the end of blow molding, which prevents (or limits) at the very least the flow of the material at the end of the blow molding, when the mold bottom 16 is in the top position.

As illustrated in the figures, the mold bottom 16 is provided with a cylindrical skirt 32 that extends axially from the side opposite to the upper surface 27 to be housed in the bore 25 in the top position of the mold bottom 16. The skirt 32 has an outside diameter that is less than the inside diameter of the bore 25, in such a way that operational play on the order of several tenths of millimeters is provided between the skirt 32 and the bore 25.

In addition, a beveled edge 33 is advantageously provided at the junction between the skirt 32 and the upper surface 27. As illustrated in FIG. 3, at the top position of the mold bottom 16, the beveled edge 33 is positioned opposite the connecting fillet 26. The result is a better channeling of the flow of air evacuated from the cavity 17 in the area of the mold bottom 16, during the blow molding of the container 2.

According to an embodiment illustrated in the figures, the mold bottom 16 also comprises a collar 34 that radially projects from the skirt 32, at a lower end of the mold bottom 16 opposite to the upper surface 27. In the top position of the mold bottom 16, this collar 34 is housed in a complementary recess 35 formed in the lateral wall 14 beyond the bore 25. The collar 34 and the recess 35 jointly form a baffle making it possible to deflect radially the flow of air evacuated from the cavity 17 during the forming of the container 2, while simultaneously reducing the pressure of the air promoting a better evacuation of the latter.

The mold 12 described above offers the following advantages.

Firstly, the horizontality of the parting line 31 between the mold bottom 16 and the wall 14 of the mold prevents the formation, on the bottom 6 of the container 2, of an axially projecting burr that would impair the stability of the container 2. It is nevertheless possible that a burr 36 exists in the form of a collar or one or more appendages extending in a horizontal plane, in the radial lengthening of the base 8. Such a radial burr 36 does not, however, impair the stability of the container 2.

Secondly, assuming that such a burr 36 exists, its thickness (equal to the thickness of the parting line 31) is small enough to be more or less imperceptible to the end user of the container 2, enhancing the perceived quality of the latter.

Thirdly, the horizontality of the parting line 31 makes it possible to reduce the thickness of the possible burr 36 formed in the latter by the material that flows outside of the cavity 17 at the end of the forming of the container 2. The amount of material taken from the base 8 (that it is therefore possible to consider as wasted) is consequently minimal, enhancing the good shaping and the structural rigidity of the base 8.

Fourthly, thanks to the separation between, on the one hand, the parting line 31, located in the vicinity of the opening 20, and, on the other hand, the operational play provided between the bore 25 and the skirt 32, there becomes no point to reducing this operational play. It is therefore possible to select a less precise but sturdier guide jack, promoting greater reliability of the mold 12. The result is also a better evacuation of the air that is present in the cavity, owing to the expansion that the air undergoes between the wall 14 of the mold 12 and the mold bottom 16.

The manufacturing of the container 2 is carried out as follows.

With the rod 13 being retracted, the first step is to insert the preheated preform 3 into the open mold 12. The mold bottom 16 is then in the bottom position. The mold 12 is reclosed, and then the rod 13 is moved in the direction of the mold bottom 16 until flattening the thus stretched material of the preform 3 there, while a gas (typically air) under a pre-blow-molding pressure (on the order of 5 to 7 bar) is injected into the preform 3.

When the rod 13 reaches the mold bottom 16 by flattening the material there, the mold bottom 16 is still in its bottom position.

The pre-blow-molding pressure is not adequate for flattening the material tightly against the wall 14 of the mold 12; it is necessary for this purpose to inject a gas (typically air) into the container 2 that is being formed at a blow-molding pressure that is higher than the pre-blow-molding pressure (for practical purposes, the blow-molding pressure is on the order of 20 to 30 bar).

The raising of the mold bottom 16 is preferably initiated during the blow-molding operation in such a way as to impart to the material of the bottom 6 a slight overstretching that promotes the orientation of the molecules and the taking of the impression of the material on the upper surface 27 of the mold bottom 16.

The acute nature of the angle A formed by the lip 22 in the area of its edge 23 limits the radial flow of the material in the area of the counterbore 24, with the material primarily having a tendency to undergo an axial expansion by remaining inside the perimeter delimited by the opening 20. Assuming that the material flows to the outside of the perimeter of the opening 20, this material is of a small amount and forms, in the area of the parting line 31, at the top position of the mold bottom 16, a burr 36 that has a small thickness and a short radial extension, as illustrated in FIG. 4.

When it is desired to implement heat-setting, the blow-molding pressure is maintained temporarily in the thus formed container 2 to keep the latter in contact with the heated wall 14 in such a way as to ensure heat-setting of the material by increasing its crystallinity and thus to increase the mechanical strength of the container 2 during its hot filling.

The rod 13, kept in contact (via the material of the bottom 6 of the container 2) against the mold bottom 16 during the raising of the latter, is then withdrawn, the inside of the container 2 is placed in the open air, and the container 2 is evacuated before the cycle is repeated for the next container.

The invention claimed is:

1. A mold (12) for manufacturing, starting from a parison (3), of a container (2) having a body (4) and a bottom (6), the bottom (6) provided with a peripheral base (8) that extends essentially perpendicular to the body (4) from a lower end (7) of the base (8), said mold (12) comprising:

a wall (14) having an inner surface (15) that extends along a central axis (X), that determines an impression of the body (4) of the container (2), and that delimits a cavity (17), with the inner surface (15) ending, at a lower end, in an opening (20), the wall (14) defining, beyond the cavity (17), a recessed reserve (21) emptying into the cavity (17) via the opening (20); and a mold bottom (16) that can move in relation to the wall (14) between an extended position, in which the mold bottom (16) is separated from the opening (20), and a retracted position, in which the mold bottom (16) is fitted into the recessed reserve (21), with the bottom having an upper surface (27) that defines a base surface (28) with the impression of the peripheral base (8) of the container (2) and that extends perpendicular to the opening (20), wherein, the wall (14) has a counterbore (24) that delimits a top of the recessed reserve (21) and that extends on a level with and around the opening (20), the counterbore (24) being essentially perpendicular to the central axis (X), and the upper surface (27) of the mold bottom (16) defines a peripheral face (30) that extends in the lengthening of the base surface (28) around the base surface (28) perpendicular to the counterbore (24), and in the retracted position, an upper surface of the peripheral face (30) is located opposite a lower surface of the counterbore (24) to thereby jointly define a peripheral parting line (31) that extends essentially perpendicular to the central axis (X).

2. The mold (12) according to claim 1, wherein the wall (14) of the mold (12) has a peripheral lip (22) that projects on the inside and has an edge (23) that defines the opening (20).

3. The mold (12), according to claim 2, wherein the lip (22) forms, in cross-section, an acute angle A in the area of the edge (23).

4. The mold (12) according to claim 1, wherein the recessed reserve (21) is delimited laterally by a bore (25) that extends axially in the lengthening of the counterbore (24).

5. The mold (12) according to claim 1, wherein a gap remains between the counterbore (24) and the peripheral face (30) in the retracted position of the mold bottom (16).

6. A mold (12) for manufacturing, starting from a parison (3), of a container (2) having a body (4) and a bottom (6), the bottom (6) provided with a peripheral base (8) that extends essentially perpendicular to the body (4) from a lower end (7) of the base (8), said mold (12) comprising:
- a wall (14) having an inner surface (15) that extends along a central axis (X), that determines an impression of the body (4) of the container (2), and that delimits a cavity (17), with the inner surface (15) ending, at a lower end, in an opening (20), the wall (14) defining, beyond the cavity (17), a recessed reserve (21) emptying into the cavity (17) via the opening (20); and
- a mold bottom (16) that can move in relation to the wall (14) between an extended position, in which the mold bottom (16) is separated from the opening (20), and a retracted position, in which the mold bottom (16) is fitted into the recessed reserve (21), with the bottom having an upper surface (27) that defines a base surface (28) with the impression of the peripheral base (8) of the container (2) and that extends perpendicular to the opening (20), wherein,
- the wall (14) has a counterbore (24) that delimits a top of the recessed reserve (21) and that extends on a level with and around the opening (20), the counterbore (24) being essentially perpendicular to the central axis (X), and
- the upper surface (27) of the mold bottom (16) defines a peripheral face (30) that extends in the lengthening of the base surface (28) around the base surface (28) perpendicular to the counterbore (24), and
- the recessed reserve (21) has a bore (25) that extends axially in the lengthening of the counterbore (24), and the mold bottom (16) is provided with a skirt (32) that extends axially from the side opposite to the upper surface (27), with the skirt (32) being housed in the bore (25) in the retracted position of the mold bottom (16).

7. The mold (12) according to claim 6, wherein operational play is provided between the skirt (32) and the bore (25).

8. Moth d A method for manufacturing a container (2) from a parison (3), the container (2) having a body (4) and a bottom (6), the bottom (6) provided with a peripheral base (8) that extends essentially perpendicular to the body (4) from a lower end (7) of the base (8) the method comprising:
- inserting the parison into a mold (12), with the mold bottom (16) being in an extended position,
- blow-molding the container by injecting a pressurized gas into the parison (3), and
- during the blow molding, moving the mold bottom (16) toward a retracted position,
wherein the mold (12) comprises:
i) a wall (14) having an inner surface (15) that extends along a central axis (X), that determines an impression of the body (4) of the container (2), and that delimits a cavity (17), with the inner surface (15) ending, at a lower end, in an opening (20), the wall (14) defining, beyond the cavity (17), a recessed reserve (21) emptying into the cavity (17) via the opening (20), and
ii) a mold bottom (16) that can move in relation to the wall (14) between the extended position, in which the mold bottom (16) is separated from the opening (20), and the retracted position, in which the mold bottom (16) is fitted into the recessed reserve (21), with the bottom having an upper surface (27) that defines a base surface (28) with the impression of the peripheral base (8) of the container (2) and that extends perpendicular to the opening (20),
the wall (14) having a counterbore (24) that delimits a top of the recessed reserve (21) and that extends on a level with and around the opening (20), the counterbore (24) being essentially perpendicular to the central axis (X),
the upper surface (27) of the mold bottom (16) defining a peripheral face (30) that extends in the lengthening of the base surface (28) around the base surface (28) perpendicular to the counterbore (24), and
in the retracted position, an upper surface of the peripheral face (30) is located opposite a lower surface of the counterbore (24) to thereby jointly define a peripheral parting line (31) that extends essentially perpendicular to the central axis (X).

9. The mold (12) according to claim 2, wherein the recessed reserve (21) is delimited laterally by a bore (25) that extends axially in the lengthening of the counterbore (24).

10. The mold (12) according to claim 2, wherein a gap remains between the counterbore (24) and the peripheral face (30) in the retracted position of the mold bottom (16).

11. The mold (12) according to claim 2, wherein the recessed reserve (21) has a bore (25) that extends axially in the lengthening of the counterbore (24), and the mold bottom (16) is provided with a skirt (32) that extends axially from the side opposite to the upper surface (27), with the skirt (32) being housed in the bore (25) in the retracted position of the mold bottom (16).

12. The mold (12) according to claim 3, wherein the recessed reserve (21) is delimited laterally by a bore (25) that extends axially in the lengthening of the counterbore (24).

13. The mold (12) according to claim 3, wherein a gap remains between the counterbore (24) and the peripheral face (30) in the retracted position of the mold bottom (16).

14. The mold (12) according to claim 3, wherein the recessed reserve (21) has a bore (25) that extends axially in the lengthening of the counterbore (24), and the mold bottom (16) is provided with a skirt (32) that extends axially from the side opposite to the upper surface (27), with the skirt (32) being housed in the bore (25) in the retracted position of the mold bottom (16).

15. The mold (12) according to claim 4, wherein a gap remains between the counterbore (24) and the peripheral face (30) in the retracted position of the mold bottom (16).

16. The mold (12) according to claim 4, wherein the recessed reserve (21) has a bore (25) that extends axially in the lengthening of the counterbore (24), and the mold bottom (16) is provided with a skirt (32) that extends axially from the side opposite to the upper surface (27), with the skirt (32) being housed in the bore (25) in the retracted position of the mold bottom (16).

17. The mold (12) according to claim 5, wherein the recessed reserve (21) has a bore (25) that extends axially in the lengthening of the counterbore (24), and the mold bottom (16) is provided with a skirt (32) that extends axially from the side opposite to the upper surface (27), with the skirt (32) being housed in the bore (25) in the retracted position of the mold bottom (16).

* * * * *